United States Patent [19]

Naccache et al.

[11] Patent Number: 5,347,581
[45] Date of Patent: Sep. 13, 1994

US005347581A

[54] VERIFICATION PROCESS FOR A COMMUNICATION SYSTEM

[75] Inventors: David Naccache, Maisons-Alfort; David M'Raihi, Paris, both of France

[73] Assignee: Gemplus Developpement, Gemenos, France

[21] Appl. No.: 122,716

[22] Filed: Sep. 15, 1993

[51] Int. Cl.[5] ............................................. H04K 1/00
[52] U.S. Cl. ........................................ 380/30; 380/28; 380/23
[58] Field of Search .................... 380/23, 24, 25, 28, 380/30, 49

[56] References Cited

U.S. PATENT DOCUMENTS

| | | | |
|---|---|---|---|
| 4,309,569 | 1/1982 | Merkle | 380/23 |
| 4,964,164 | 10/1990 | Fiat | 380/28 X |
| 5,214,702 | 5/1993 | Fischer | 380/25 X |
| 5,263,085 | 11/1993 | Shamir | 380/28 X |

FOREIGN PATENT DOCUMENTS 093003562  2/1993  World Int. Prop. O. ............ 380/28

*Primary Examiner*—Tod R. Swann
*Attorney, Agent, or Firm*—Nilles & Nilles

[57] ABSTRACT

The process concerns a system, comprising communication devices A1, A2, ... Aα connected to a central verification device B by the means of communication interfaces wherein each device Ai, having data processing means, communication means, memory means and random or pseudo-random generation means, transmits to the device B, having data processing means, communication means and memory means, a set of DSS digital signatures. Once all the signatures has been received by device B, device B verifies them simultaneously by performing few calculations for verifying a great same number of signatures sequentially.

7 Claims, 4 Drawing Sheets

VERIFICATION PROCESS FOR A COMMUNICATION SYSTEM

The present invention relates to a system for improving the computational efficiency of the Digital Signature Algorithm (DSA), proposed by the US National Institute of Standards and Technology (NIST) in a "A Proposed Federal Information Processing Standard for Digital Signature Standard (DSS)", Federal Register Announcement, Aug. 30, 1991, pp 42980-42982. This is achieved by allowing a quick and simultaneous batch verification of a big number of signatures in a unique operation. The invention is used for improving transactions, economical or not, between persons by utilisation of chip cards.

BACKGROUND OF THE INVENTION

Although the idea of inserting a chip into a plastic card is relatively old (first patents are now seventeen years old), practical applications only emerged a few years ago because of some computational limitations of the chips. Progress in storage capacity, security and circuit technology (for example EEPROM) led quickly to new generations of cards and more ambitious applications such as the new emerging US Digital Signature Standard, which itself renders significant many new kinds of transactions.

This DSA was proposed by the US National Institute of Standards and Technology (NIST) to provide an appropriate core for applications requiring a digital. rather than written signature. The DSA digital signature is a pair "r and s" of large numbers represented in a computer as strings of binary digits. The digital signature is computed using a set of rules (i.e. the DSA) and a set of parameters such that the identity of the signatory and integrity of the data can be verified. The DSA provides the capability to generate and verify signatures.

Signature generation makes use of a private key "x" to generate a digital signature. Signature verification makes use of a public key "y" which corresponds to, but is not the same as, the private key. Each user possesses a private and a public key pair. Public keys are assumed to be known to the public in general whereas private keys are never shared. Anyone can verify the signature of a user by employing that user's public key. Signature generation can be performed only by the user's private key.

DSA parameters are:

1—a first module p where $2^{L<1}<p<2^L$ for $512 \leq L \leq 1024$ and $L=64\alpha$ for some $\alpha$. Practically p is a string of L bits, for example 512 bits.

2—a second module q such that $2^{159}<q<2^{160}$ and $p-1$ is a multiple of q. Practically q is a string of 160 bits. Meanwhile it could be different.

3—a number g, of order q modulo p such that $g=h^{(p-1)/q}$ modulo p, where h is any integer such that $1<h<p-1$ and where g is greater than 1.

4—a number x, defined randomly or pseudo randomly and which is the private key.

5—a number y, defined by the relation $y=g^x$ modulo p, which is the public key.

6—a number k generated randomly or pseudo randomly such that $0<k<q$.

The integers p, q and g are system parameters and can be public and/or common to a group of users. The user's private and public keys are respectively x and y. Parameters x and k are used for signature generation only and must be kept secret. Parameter k must be regenerated for each signature. Parameter y is shared by many groups of users.

In order to sign a message m (hashed value of a primitive binary file M), a signer computes the signature "r and s". A hashed value m of a primitive file M is a binary rearranged string of some (or all) of the bits of M. A signer is practically a microprocessor of the chip card of the user which performs a programmed operation. This operation may be performed automatically at the end of the edition of the primitive file M or the message m. It may also be performed at a will after this edition. The computation made for this signature which is particularly depicted in KNUTH, is as follows: $r=(g^k$ modulo p$)$ modulo q and $s=((m+xr)/(k))$modulo q. The first part r of the signature is dependant on the used system by g p q and k, while s is dependant on the message m and the private key x, and also q r k.

In this signature a division by k is done modulo q (that is 1/k is the number k' such that $kk' \equiv 1$ modulo q). For instance, if $q=5$ and $k=3$ then $1/k$ modulo $5=2$, as a matter of fact $\frac{1}{3}=2$ modulo 5 since $3 \times 2=6 \equiv 1$ modulo 5.

After checking that r is different from 0 and from s, as explained in the DSA description, the signature "r and s" is ready. This signature authenticates that the message m was provided by the owner of the chip card with his correct private key "x". It is then sent together with the message m to a verifier authority.

This verifier authority makes a verification of what is received with a verifier. A verifier, which practically comprises a processor performing a verification program, makes a batch verification. When this batch verification is made the message m is authenticated, it is recognised that this message issued from an authorised user, and the economical consequences of this message may be then validated. That means that the verifier authority may perform an action related to the message m, that means for example authorising a transaction between the user of the chip card and a trader and performing corresponding funds transfers or even authorising a transaction between this user and the verifier authority.

DSS batch verification allows a verifier to delay the verification of a set of DSS signatures until he decides that he has an enough big quantity of these and then verify all of them at once.

Such an approach is advantageous in many practical a situations. for example banks send and receive transaction orders during all the day but execute (inter-compensate) them during the night. Pay-TV subscribers purchase viewing rights from a program provider that has to check the individual validity of each purchasing order before downloading the rights over-the-air. Similar situations are frequently met in many other electronic transactions.

More generally, batch signature verification is useful whenever a certain time, that allows a reverse operation, a censorship or an opposition action, separates the signature from its consequence (typically the delivery of the goods or services to the user-signer).

The verifier computes:

1—$w=1/s$ modulo q (since it knows the publicly shared value q ant it receives s). Should it exist many groups of users with different sets of p q g numbers, they are sent to the verifier at a same time as the message m and the r and s signature.

2—$u_1 = m \cdot w$ modulo q (since it knows m received, q shared and w previously computed).

3—$u_2 = r \cdot w$ modulo q (since it knows r received, q shared and w previously computed).

4—$v = (g^{u_1} \cdot y^{u_2}$ modulo p) modulo q (since $u_1$ and $u_2$ are previously computed and y is the public key for the group of users).

Then it checks if v and r match to accept or reject the signature. That is too long when too many verifications have to be made

SUMMARY OF THE INVENTION

Thus, it is an object of the invention to disclose a general efficient system by the means of which a set of signing devices A1, A2, ... such as namely smart-cards, badges or electronic keys, will transmit DSS signatures to a central verification apparatus B (e.g. a personal computer, or a remote server) that will verify all the signatures by a one and unique verification operation.

The invention concerns a verification process in a system comprising n communicating devices Ai to be connected to a central verification device B by the means of communication interfaces, each communicating device Ai having data processing means, communication means, memory means and random or pseudo-random generation means, performing a digital signature algorithm and producing a digital signature signal, and transmitting a digital signature signal to the central verification device B, the central verification device B having data processing means, communication means and memory means, verifying, in a batch, simultaneously a set of many digital signatures signals once all these digital signature signals have been received, by performing, firstly, processings of the received digital signature signals and by computing, secondly, on the processing results a verification calculation.

In this configuration, it is assumed that all the users i owning communicating devices Ai are using the same DSS modulo p and q and number g, but have different pairs of keys $(x_i, Y_i)$ and send each $t_i$ DSS signatures for verification. The verifier receives thus $$\sum_{i=1}^{i=a} t_i$$

DSS signatures. It will be denoted by $\{r_{i,j}, s_{i,j}\}$ the DSS signatures of the messages $\{m_{i,j}\}$ where $m_{i,j}$ denotes the $j^{th}$ message signed by Ai.

The invention will be better understood by reading the following description and by examining the attached drawings. These indications are in no way limitative of the invention.

PREFERRED EMBODIMENT OF THE INVENTION

Figure 1:
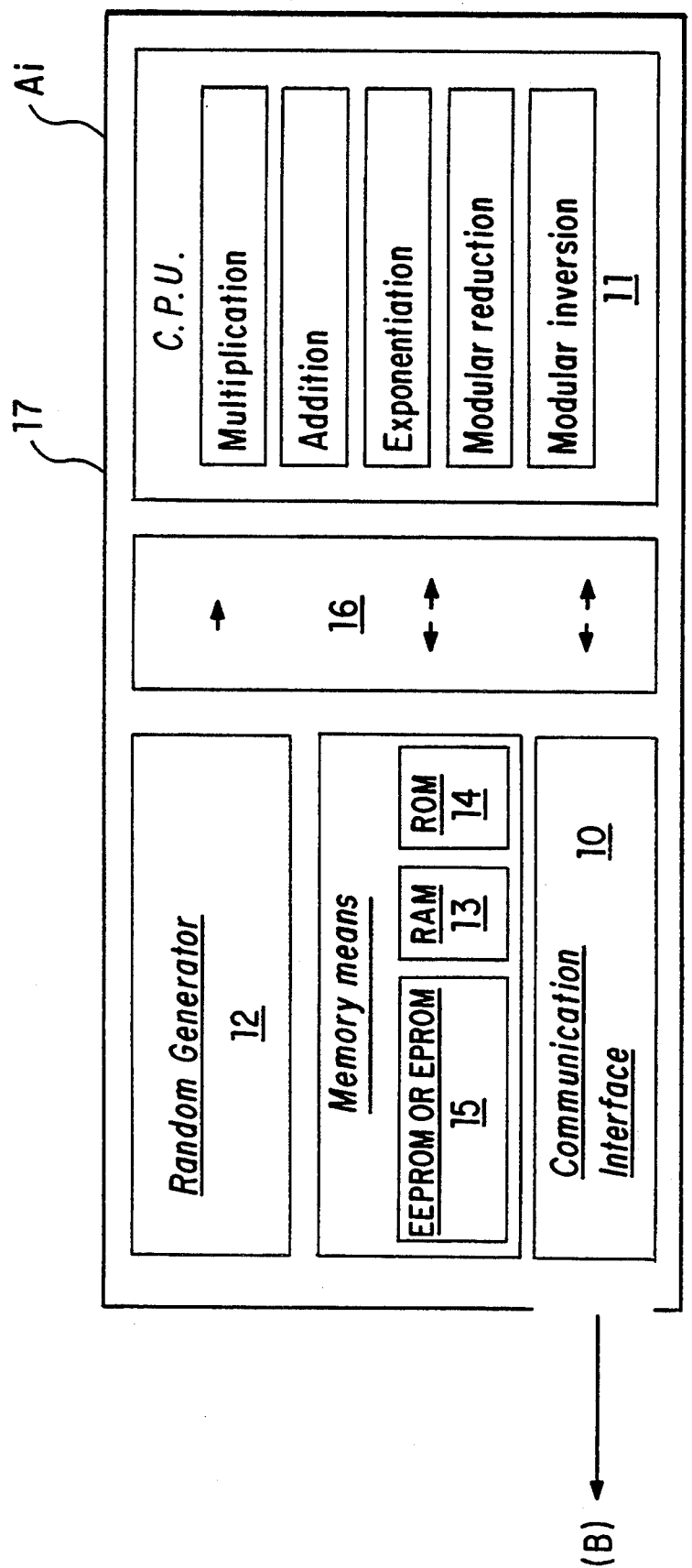
FIG. 1 depicts a block diagram of an communicating device Ai according to the system of the present invention.

According to the invention, FIG. 1, each apparatus Ai comprises a central processing unit (CPU) 11, a communication interface 10, a random or pseudo random number generator 12, a Random Access Memory (RAM) 13 and/or a Read Only Memory (ROM) 14 and/or an Electrically (possibly Erasable) Programmable Memory (EPROM or EEPROM) 15.

The CPU and/or the ROM comprises programs or computational resources corresponding to or implementing the signature generation part of the DSS protocol (rules and a hash function), multiplication, addition, exponentiation and modular reduction and inversion. Some of these operations can be merged together (for instance, the modular reduction can be integrated directly into the multiplication).

As for the DSS implementation, the RAM typically comprises the file M on which the hash function and the DSS signature generation rules are applied successively. The EPROM (or EEPROM) 15 contains the values of parameters: p, q, g, $x_i$ which are used while $k_{i,j}$ is generated at transaction j. These values are used as explained in the following description.

The CPU 11 pilots, via a data control and address bus 16, the communication interface 10, the read and write operations in memories 13, 14, 15 and gets random numbers from the random number generator 12.

Each apparatus Ai is protected from the outside world by physical protection means 17. This protection should be sufficient for preventing any unauthorised entity from gaining access to the secret key $x_i$ stored in ROM 14. Today's most popular techniques for achieving this goal are the encapsulation of the chip into a security module and the providing of the chip for example with light, temperature, abnormal voltage and abnormal clock frequency detectors.

Particular design considerations such as the scrambling of the memory mapping are commonly used as well.

Figure 2:
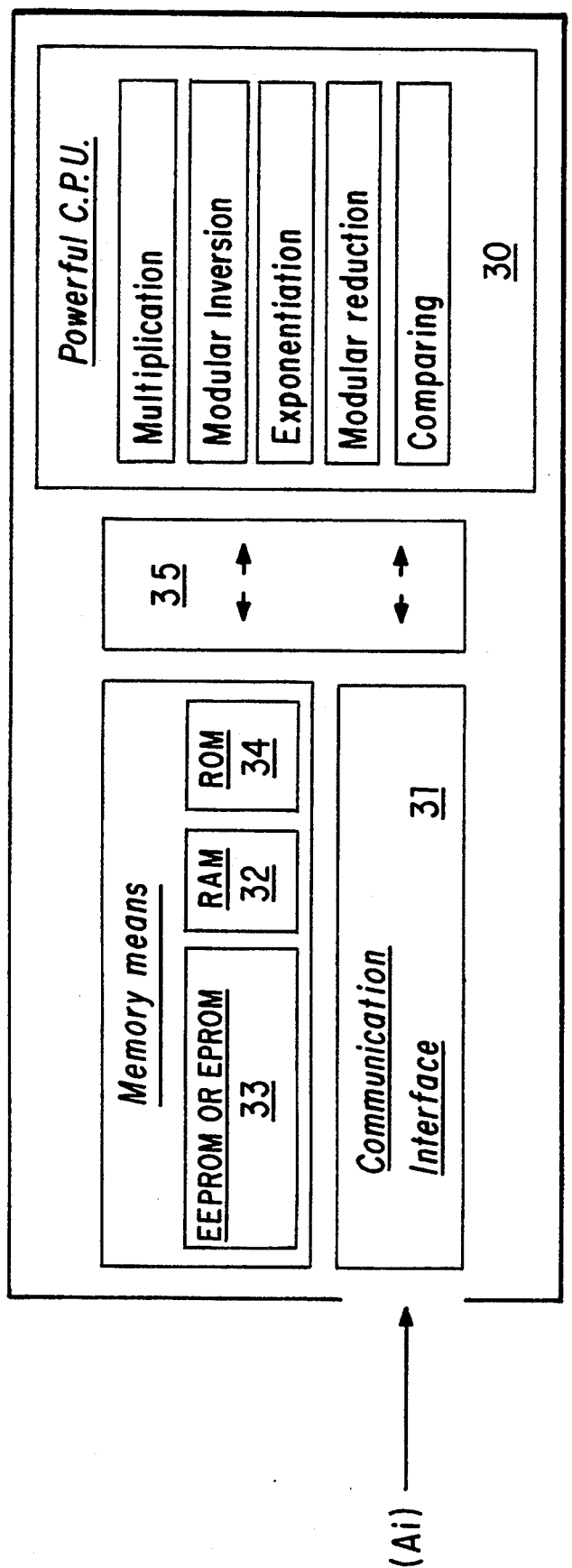
FIG. 2 depicts a block diagram of a central verification device B according to the system of the present invention.

Device B, FIG. 2, comprises at least: a central processing unit (CPU) 30 and memory means 32 (RAM) and/or 33 (EEPROM or EPROM) and/or 34 (ROM). The CPU 30 pilots, via a data control and address bus 35, a communication interface 31, and read and write operations in memories 32, 33 and 34. The CPU 30 and/or the ROM of device B comprises programs or computational resources corresponding to, or implementing, the verification part of the DSS protocol (rules and a hash function), multiplication, modular inversion, comparing, exponentiation and modular reduction. Some of these operations can be merged together (for instance, the modular reduction can be integrated into the multiplication).

Figure 3:
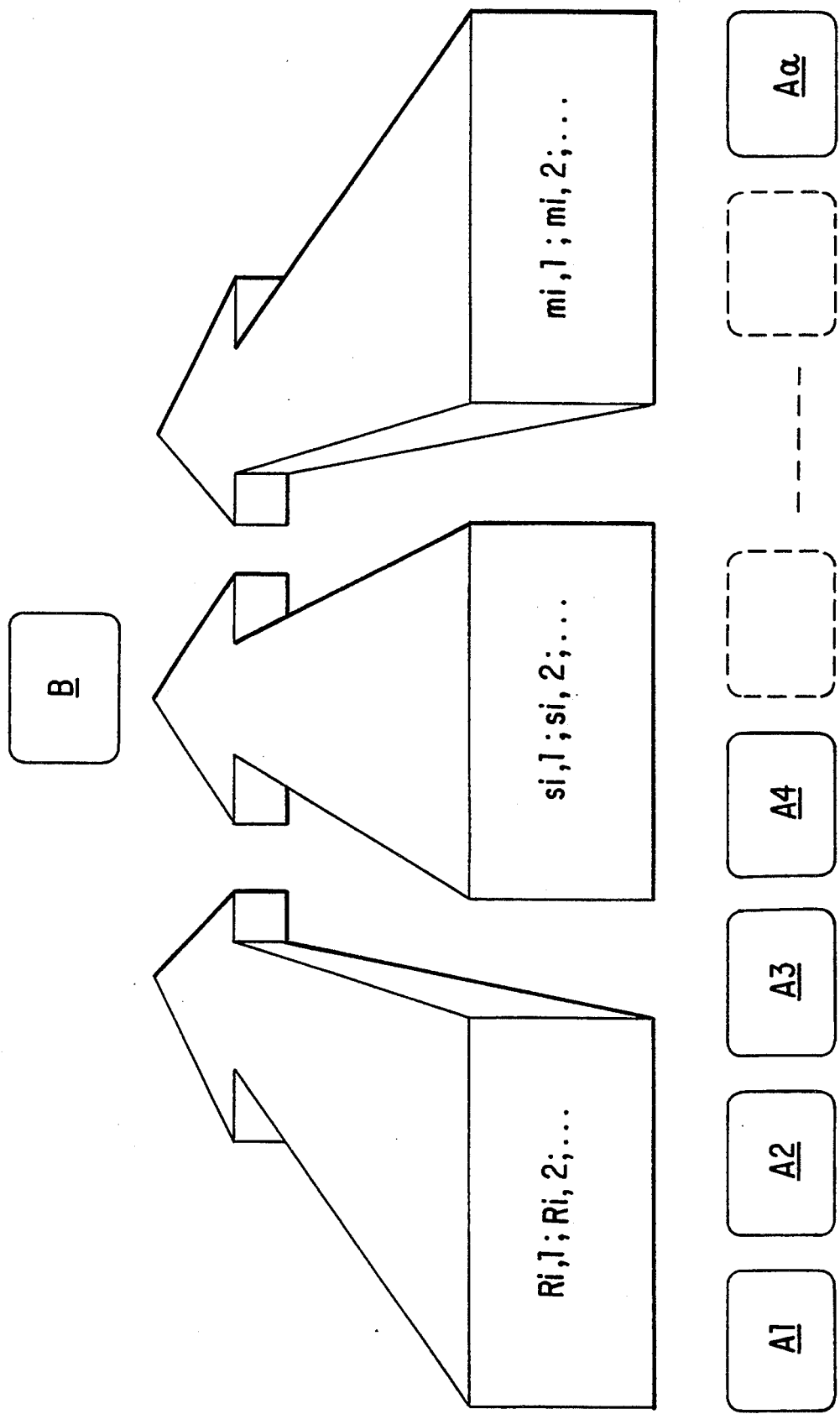
FIG. 3 represents the data transmitted from devices $A_i$ to device B.
Figure 4:
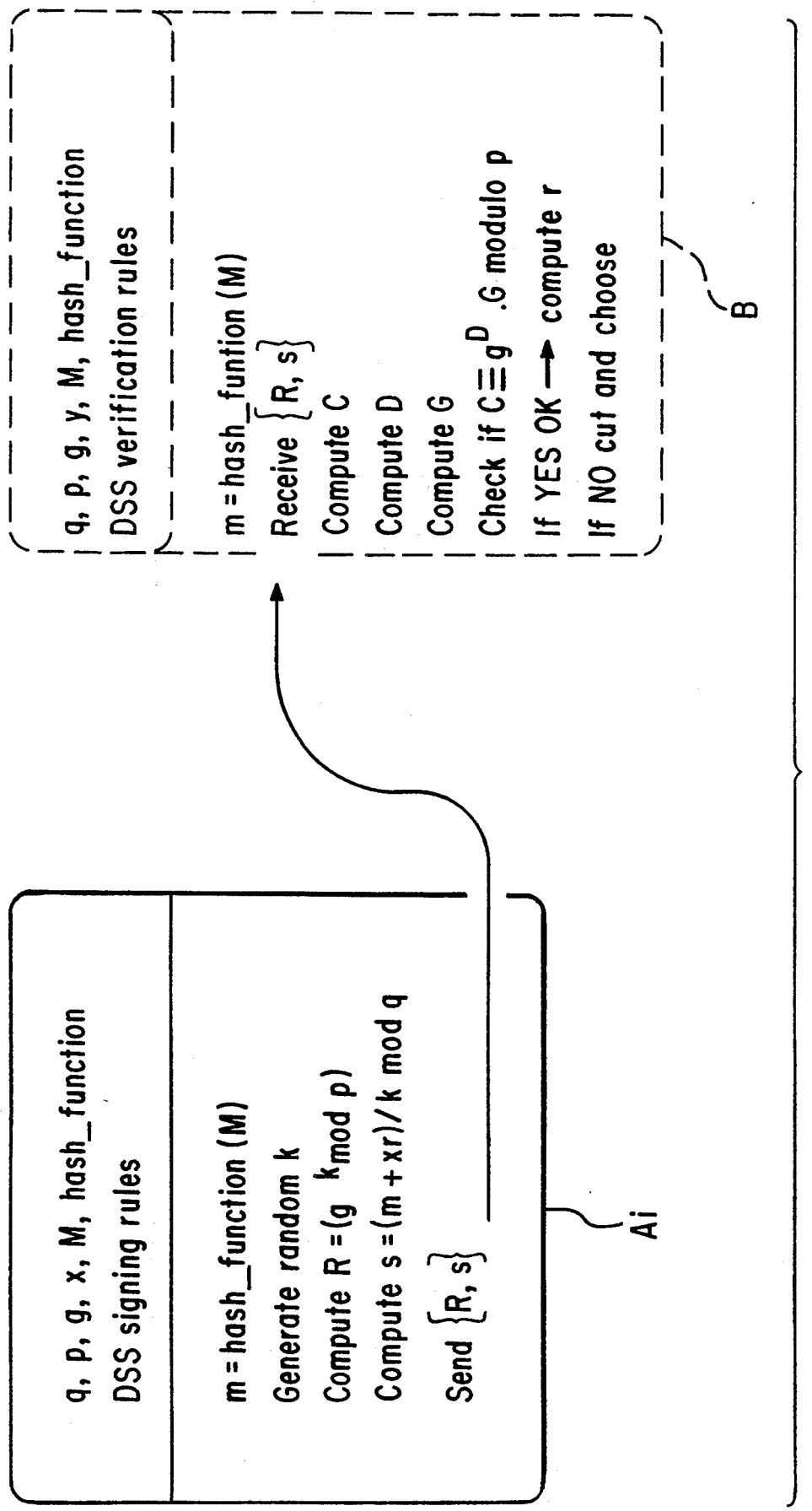
FIG. 4 is a flow diagram showing the steps of normal DSS operations between the signing device Ai and a verification device B.

In the process of the invention, the batch signature verification is achieved by exchanging at least the following data, as represented on FIG. 3, between the signing devices A1, A2, ..., and the verification device B represented on FIGS. 1 and 2. To sign a message $m_{i,j}$, a device Ai, picks a random number $k_{i,j}$, computes and sends to device B, the data $R_{i,j}, s_{i,j}$ where $R_{i,j} = g^{k_{i,j}}$ modulo p (here no more modulo q) and $$s_{i,j} = ((m_{i,j} + x_i r_{i,j})/(k_{i,j})) \text{ modulo } q.$$

It may send too an $y_i$ code if there is many groups of users being differentiated by their public keys $y_i$. Thus at each sending it is sent $m_{i,j}$, $R_{i,j}$, $s_{i,j}$, and eventually j (the number of signature made by the device $A_i$), $y_i$, q, p and g. Of course an identification of the device $A_i$ is sent. It may be sent before or after the sending of $m_{i,j}$, $R_{i,j}$, $s_{i,j}$. The key $y_i$ and the modules p q and g may also be preferably extracted by the device B from a correspondance table memorised in memory 33 starting from a received identification of the device $A_i$.

Once an enough large set of couples $R_{i,j}, s_{i,j}$ has been received by device B (for example one thousand of couples), this device batch-verifies all the couples according to the invention by checking in a first test if $$C \equiv g^D \cdot G \text{ modulo } p.$$

This first test is achieved by computing first the C, D, and G processings where $$C = \prod_{i=1}^{i=\alpha} \prod_{j=1}^{j=t_i} R_{i,j} \text{ modulo } p$$

$$D = \sum_{i=1}^{i=\alpha} \sum_{j=1}^{j=t_i} \frac{m_{i,j}}{s_{i,j}} \text{ modulo } q$$

$$G = \prod_{i=1}^{i=\alpha} y_i^{H_j} \text{ modulo } p \text{ where}$$

$$H_j = \sum_{j=1}^{j=t_i} \frac{R_{i,j}}{s_{i,j}} \text{ modulo } q$$

Where $\pi$ means a multiplication made over all the received $R_{i,j}$, $\Sigma$ means a summation.

That means that previous processings of the received messages and signatures are performed before checking. These processings have as an object to reduce the final number of exponentiations which are normally to be performed by the verifier and which are very time consumming. As a matter of fact C and D are only multiplications which are less time consumming than exponentiations. Then for computing G, all the couples attached to a same public key $y_i$ are preferably gathered for computing $H_j$, a summation of divisions (identical to multiplications). Then there is made only as many exponentiations plus one (for computing $g^D$) as there is different used public keys $y_i$ in the batch-verification. The number of exponentiations may thus be reduced to 20 (for 19 differents keys) instead of 2000 for 1000 signatures (in the computation of v there are two exponentiations).

In order to prevent that a user, having the right to sign a message being given twice times does not sent a signature by which it could appear that a same message has been signed twice, the B devices checks also preferably in another test that $m_{i,j}$ is different from $m_{i',j'}$ if i,j is different from i',j'. In this preferable mode j is an arbitrary renumbering of the received messages.

If the first test holds, or preferably if both the first and second test hold, B accepts all the signatures. On the contrary, if the test fails, device B performs any (straightforward) "cut & choose" tree search to find where the false signatures are. For example half of the couples $R_{i,j}, s_{i,j}$ are checked in a batch, the second half being checked in another. Thus it appears possible to identify step by step simply the false(s) signatures. To cut the signatures, a choice may be made of all the signatures pertaining to a particular public key $y_i$. If there is only one public key y, this kind of cut is not possible but the computation of G is more simplified.

Finally, B translates the couples $R_{i,j}$ into standard DSS signatures by substituting $R_{i,j}$ by $r_{i,j}$. This is achieved by making $r_{i,j} = R_{i,j}$ modulo q, for $1 \leq i \leq \alpha$ and $1 \leq j \leq t_i$. For the rest the application may be run as desired.

Thus, by the means of the process of the invention, computation is traded-off against an additional transmission of bits between the signers and the verifier. This additional transmission of bits concerns $\log_2 (p/q)$ bits for each of the sent signatures since a "modulo q" operation is made only at the device B.

In many modern portable devices such as PCMCIA cards, portable PC's or the so-called super datahighways, the communication of data takes negligible time when compared to the effort requested for performing modular exponentiations and therefore the inventive method offers advantageous trade-off possibilities that prior state art does not.

We claim:

1. A verification process in a system comprising $\alpha$ communicating devices Ai to be connected to a central verification device B by the means of communication interfaces, each communicating device Ai
having data processing means, communication means, memory means and random or pseudo-random generation means,
performing a digital signature algorithm and producing a digital signature signal, and
transmitting a digital signature signal to the central verification device B, the central verification device B
having data processing means, communication means and memory means,
verifying, in a batch, simultaneously a set of many digital signatures signals once all these digital signature signals have been received, by
performing, firstly, processings of the received digital signature signals and by
computing, secondly, on the processing results a verification calculation.

2. A process according to claim 1, wherein the digital signature algorithm is DSS and the batch verification operation is performed by:

a. device Ai, to sign a message j whose value is $m_{i,j}$, picks a random number $k_{i,j}$, computes a data couple $R_{i,j}, s_{i,j}$ where $$R_{i,j} = g^{k_{i,j}} \text{ modulo } p$$

and $$s_{i,j} = ((m_{i,j} + x_i r_{i,j})/(k_{i,j})) \text{ modulo } q,$$

p being a first module such that $2^{L-1} p < 2^L$ for $512 \leq L \leq 1024$ and $L = 64\alpha$ for some $\alpha$, q being a second module such that $2^{159} < q < 2^{160}$ and p-1 is a multiple of q, g being a number such that $g = h^{(p-1)/q}$ modulo p, where h is any integer such that $1 < h < p-1$ and where g is greater than 1, $x_i$ being a secret key belonging to device $A_i$, and sends this couple to device B, b. device B, once a set of couples has been received, batch-verifies the set of couples by checking if:

$C \equiv g^D \cdot G \text{ modulo } p$ by computing first the C, D, and G processings where $$C = \prod_{i=1}^{i=\alpha} \prod_{j=1}^{j=t_i} R_{i,j} \text{ modulo } p$$

$$D = \sum_{i=1}^{i=\alpha} \sum_{j=1}^{j=t_i} \frac{m_{i,j}}{s_{i,j}} \text{ modulo } q$$

$$G = \prod_{i=1}^{i=\alpha} y_i^{H_j} \text{ modulo } p \text{ where}$$

$$H_j = \sum_{j=1}^{j=t_i} \frac{R_{i,j}}{s_{i,j}} \text{ modulo } q$$

c. if the test holds, B accepts all the signatures.

3. A process according to claim 1, wherein if the test fails, B performs a cut and choose tree search to find where the false signatures are.

4. A process according to claim 2, wherein B translates the couples into standard DSS signatures by substituting $R_{i,j}$ by $r_{i,j} = R_{i,j}$ modulo q.

5. A process according to claim 3, wherein B translates the couples into standard DSS signatures by substituting $R_{i,j}$ by $r_{i,j} = R_{i,j}$ modulo q.

6. A process according to claim 3, wherein the cut and choose process comprises the gathering of the message corresponding to a same public key $y_i$.

7. A process according to claim 5, wherein the cut and choose process comprises the gathering of the message corresponding to a same public key $y_i$.

* * * * *